US011865073B2

(12) United States Patent
Gobbi Frattini

(10) Patent No.: US 11,865,073 B2
(45) Date of Patent: Jan. 9, 2024

(54) ASSEMBLY WITH CONNECTABLE AND DISCONNECTABLE ELEMENTS FOR THE RECONSTITUTION OF FLUID DRUGS AND NUTRIENTS WITH ACTIVE SUBSTANCES IN POWDER, LIQUID OR GEL FORM, AND RELATED METHOD OF USE

(71) Applicant: Paolo Gobbi Frattini S.R.L., Milan (IT)

(72) Inventor: Paolo Giuseppe Gobbi Frattini, Sondalo (IT)

(73) Assignee: PAOLO GOBBI FRATTINI S.R.L., Milan (IT)

( * ) Notice: Subject to any disclaimer, the term of this patent is extended or adjusted under 35 U.S.C. 154(b) by 239 days.

(21) Appl. No.: 17/529,330

(22) Filed: Nov. 18, 2021

(65) Prior Publication Data

US 2022/0151872 A1 May 19, 2022

(30) Foreign Application Priority Data

Nov. 18, 2020 (IT) ........................ 102020000027669

(51) Int. Cl.
*A61J 1/20* (2006.01)
*A61J 1/10* (2006.01)
*A61J 1/14* (2023.01)

(52) U.S. Cl.
CPC ............... *A61J 1/2037* (2015.05); *A61J 1/10* (2013.01); *A61J 1/1412* (2013.01); *A61J 1/201* (2015.05);

(Continued)

(58) Field of Classification Search
CPC .......... A61J 1/2037; A61J 1/10; A61J 1/1412; A61J 1/201; A61J 1/2027; A61J 1/2048;

(Continued)

(56) References Cited

U.S. PATENT DOCUMENTS 4,759,756 A * 7/1988 Forman ................. A61J 1/2089
D24/129
2004/0199139 A1* 10/2004 Fowles ................. A61J 1/2089
604/414

(Continued)

FOREIGN PATENT DOCUMENTS

EP 2 399 565 12/2011

OTHER PUBLICATIONS

Italian Search Report.

*Primary Examiner* — Guy K Townsend
*Assistant Examiner* — Alessandro R Del Priore
(74) *Attorney, Agent, or Firm* — Jacobson Holman PLLC

(57) ABSTRACT

Assembly with connectable and disconnectable elements comprises a flexible bag containing liquid solution with a first valve connector, at least one vial with active substance and provided with a hermetic closing cap, a coupling and piercing device couplable to the cap of the vial and an adapter between the first connector and the coupling and piercing device. The adapter has a hollow external body with a first end fixable by screwing to the first connector, an axially bored, coaxial internal stem, the screwing causes the opening of the first connector and a second end including a second valve connector fixable to the coupling and piercing device and is screwable in the external body so that internal stem causes the opening of the second valve connector.

7 Claims, 12 Drawing Sheets

(52) U.S. Cl.
CPC ........... *A61J 1/2027* (2015.05); *A61J 1/2048* (2015.05); *A61J 1/2089* (2013.01)

(58) Field of Classification Search
CPC ...... A61J 1/2089; A61J 1/2013; A61J 1/2096; A61J 1/1406; A61J 1/1468; A61J 1/145; A61J 1/2051; A61J 1/1481; A61J 1/20; A61J 1/14; A61J 1/05; A61J 1/2082; A61J 1/12; A61J 1/1475; A61J 1/2058; A61J 1/2075; A61M 39/045; A61M 39/22; A61M 39/26; A61M 2039/0633; A61M 2039/062; A61M 39/0693; A61M 5/162; A61M 2005/1587; A61M 2039/064; A61M 2039/0653; A61M 2039/1072; A61M 2039/1077; A61M 2039/1061; A61M 5/14; Y10S 604/905; Y10S 128/912; B65D 81/32; A61L 2/202; A61L 2/0094; A61L 2202/23
See application file for complete search history.

(56) References Cited

U.S. PATENT DOCUMENTS

| | | | | | |
|---|---|---|---|---|---|
| 2005/0137566 | A1* | 6/2005 | Fowles ................. | A61J 1/2089 604/905 |
| 2007/0088252 | A1* | 4/2007 | Pestotnik ............ | A61M 39/223 604/82 |
| 2008/0009789 | A1* | 1/2008 | Zinger ................ | A61M 5/3213 604/181 |
| 2012/0037266 | A1* | 2/2012 | Bochenko ............... | B65B 3/003 141/98 |
| 2012/0053555 | A1* | 3/2012 | Ariagno ................ | A61J 1/2089 604/416 |
| 2013/0299021 | A1* | 11/2013 | Gobbi Frattini ...... | A61J 1/1475 137/624.27 |
| 2015/0020919 | A1* | 1/2015 | Wu ...................... | A61J 1/2089 141/27 |

* cited by examiner

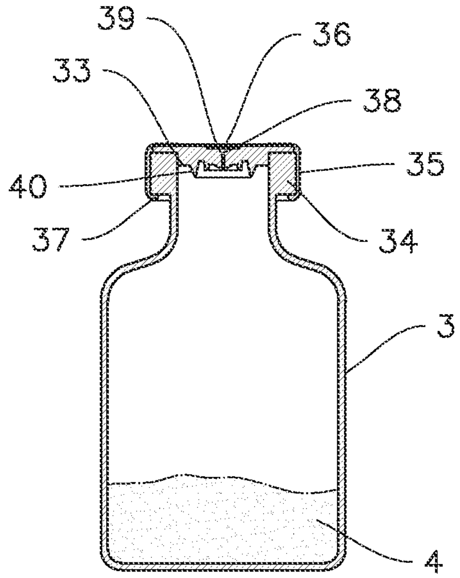
Fig.9
Fig.10
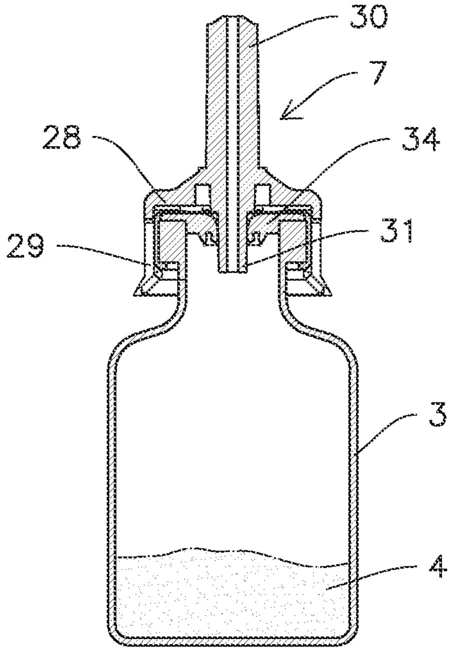

ASSEMBLY WITH CONNECTABLE AND DISCONNECTABLE ELEMENTS FOR THE RECONSTITUTION OF FLUID DRUGS AND NUTRIENTS WITH ACTIVE SUBSTANCES IN POWDER, LIQUID OR GEL FORM, AND RELATED METHOD OF USE

BACKGROUND OF THE INVENTION

The present invention relates to an assembly with connectable and disconnectable elements which is usable for the reconstitution of fluid drugs and nutrients with active substances in powder, liquid or gel form.

In hospitals there is often the need to administer dosed amounts of active substances of various type, in particular drugs or nutrients, which are made available separately, in particular in powder, liquid or gel form, inside conveniently sealed vials.

In order to make the active substances suitable for administration (infusion or other method) it is necessary to form a liquid mixture comprising, in addition to the active substance, a liquid solution operating as a diluent or solvent.

It is highly important that the formation of this mixture and the introduction thereof into a bag which is usable for the administration to the patient occurs under absolutely sterile conditions in order to avoid contamination of the active substance and dangers for the medical and nursing staff which could derive from possible toxicity of the active substance, if in the form of a drug.

These safety conditions are particularly relevant and more difficult to obtain if drugs with multiple doses of the same active substance or with doses of different active substances are reconstituted in the same bag, in both cases taken from as many vials.

US 2004/01991139 A1 describes a drug reconstitution device, which allows a liquid container, in particular a flexible bag, to be put in communication with a vial containing the drug to be diluted or reconstituted. The connection device has ends which are connectable to the liquid container and to the vial, respectively, and comprises two sleeves axially sliding with respect to each other and a piercing device with a needle end placed inside the two sleeves. By axially sliding the two sleeves, the device can be moved from a deactivated position to an activated position in which the two needle ends of the piercing device sequentially pierce closing membranes of the vial and of the liquid container.

US 2015/020919 A1 describes an adapter assembly for establishing a bidirectional fluid connection between a cartridge with liquid diluent and a vial with drug to be reconstituted. The adapter comprises a needle-end piercing device placed inside a hollow body interposed between the cartridge and the vial. The needle piercing device is movable from an initial position, in which the two needles are spaced from the cartridge and the vial, to a use position, in which the two needles are inserted into the closing elements of the cartridge and the vial and establish a fluid communication therebetween.

SUMMARY OF THE INVENTION

It is the object of the present invention to provide an assembly which, without the use of needles, allows the reconstitution of fluid drugs or nutrients, under conditions of absolute sterility, inside a bag containing a liquid solution, taking the active substance(s) from respective vials.

According to the invention, such an object is achieved by an assembly as defined in the claims.

Once assembled, the assembly according to the present invention allows sequentially opening the hermetic closing valves of the two connectors to allow the liquid solution to pass from the bag to an underlying vial containing an active substance for the formation of a fluid mixture of liquid solution and active substance. Overturning the assembly, it is then possible to transfer the fluid mixture from the vial to the bag, which can then be separated from the rest of the assembly (vial, coupling and piercing device, and adapter) to be used after closing the valves of the two connectors. This method of use is defined in the method claims.

If required, a second dose of the same active substance, or a dose of a different active substance, can be added to the fluid mixture thus formed inside the bag, carrying out the same connection to a second vial and then the operating sequence described above. The above is repeatable with other vials of active substance.

Whatever the number of vials with active substance to be mixed, the two hermetic closing valves which are openable and automatically hermetically resealable allow operating under conditions of absolute sterility, as desired.

DESCRIPTION OF THE DRAWINGS

The features of the present invention will become more apparent from the following detailed description of an embodiment thereof, shown by way of example in the accompanying drawings, in which:

FIG. 9 shows an axial section of the vial with the cap in the closed condition;

FIG. 10 shows an axial section of the vial coupled to the coupling and piercing device in FIG. 7;

DETAILED DESCRIPTION OF THE DRAWINGS

Figure 1:
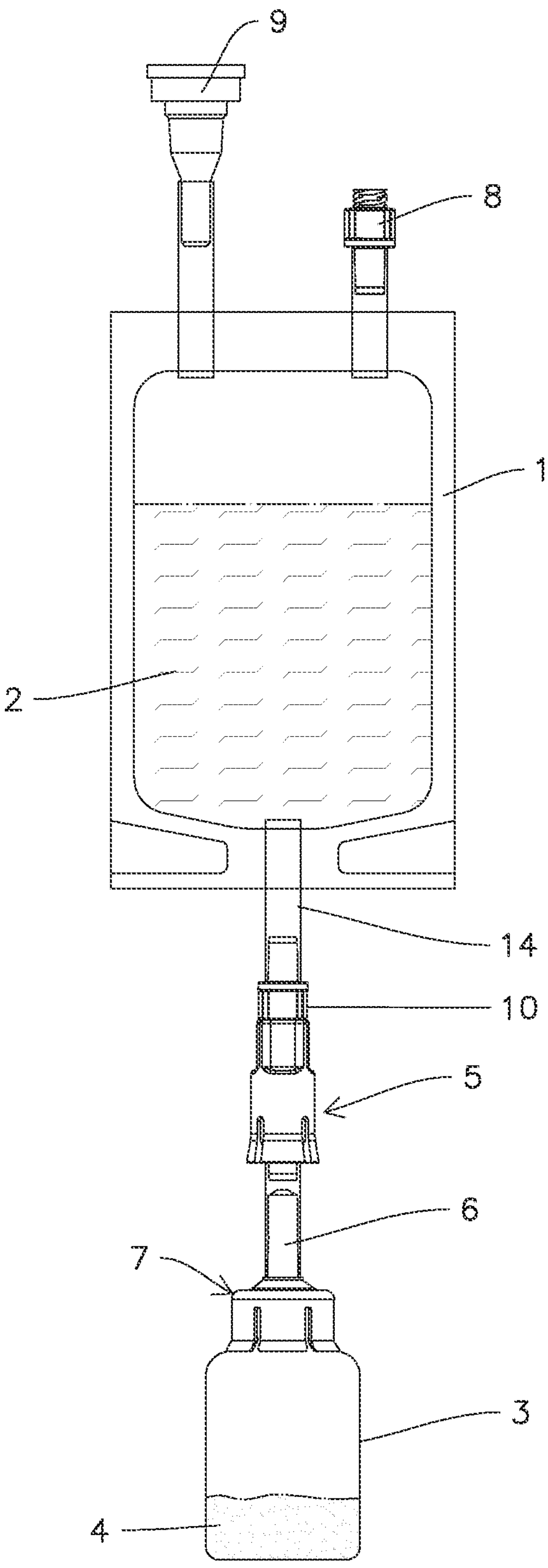
FIG. 1 shows an assembly according to the invention in an assembled condition.
Figure 2:
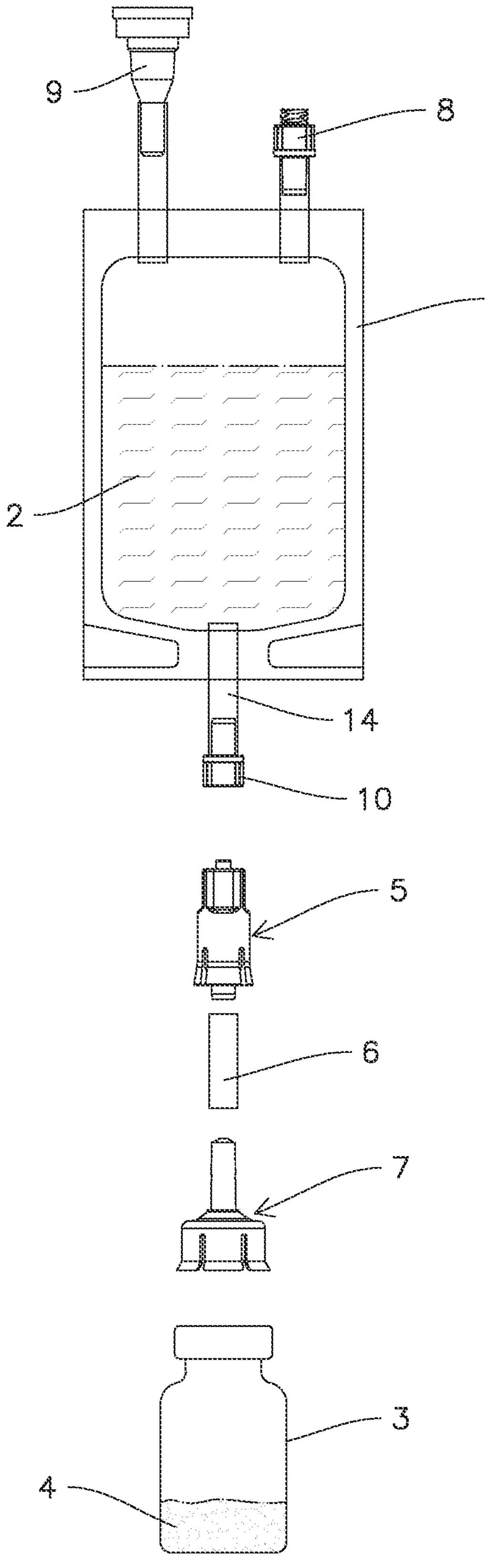
FIG. 2 shows the same assembly before assembling.

An exemplary embodiment of the assembly according to the present invention is shown in a fully assembled condition in FIG. 1 and in a completely disassembled condition in FIG. 2.

From the aforesaid figures it can be seen that the assembly comprises a flexible bag 1 preliminarily filled with a liquid diluent or solvent solution 2, a vial 3 with a cap containing an active (pharmaceutical or nutritional) substance 4 in powder, granules, liquid or gel form, and between the bag 1 and the vial 3, connection elements consisting of an adapter 5, a tube 6, and a coupling and piercing device 7 for coupling and piercing the cap of the vial 3.

The flexible bag 1 is laterally compressible between two stiffened ends provided with connectors.

One end (upper end in FIGS. 1 and 2) of the bag 1 is provided with a filling connector 8 which is preferably of the type described in EP 2 667 839 B1, i.e., with a hermetic closing valve which, when filling the bag 1 with the liquid solution 2, is press-openable by inserting a syringe luer or similar device without a needle and is automatically hermetically reclosable following the extraction of the same luer.

Next to the filling connector 8, a delivering and emptying connector 9 is provided, which can be of any suitable known type for the connection of an infusion set.

Figure 3:
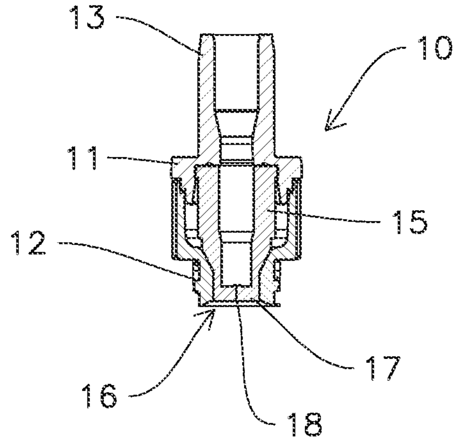
FIG. 3 shows an axial section of the first connector with hermetic closing valve, which is associated with the bag containing the liquid solution.

The other end (lower end in FIGS. 1 and 2) of the bag 1 in turn includes a first valve connector 10 of the type described in EP 2 667 839 B1, the details of which are shown in FIG. 3. In essence, the first connector 10 comprises an external body 11 with external thread 12 and tubular end 13 which is adapted to be inserted by pressing into a tube 14 protruding from the bag 1 (FIGS. 1 and 2) and an internal axially bored body 15 which is placed after that of the tubular end 13 and is normally closed at one end opposite to the tubular leg 13 by a hermetic closing valve 16 consisting of a flexible membrane 17 with axial slot 18 normally hermetically closed, which is openable by an axial pressure exerted from the outside and automatically hermetically reclosable when such a pressure is stopped. For more details on the operating mode of the aforesaid valve element 16, reference should be made to the content of EP 2 667 839 B1.

Figure 4:
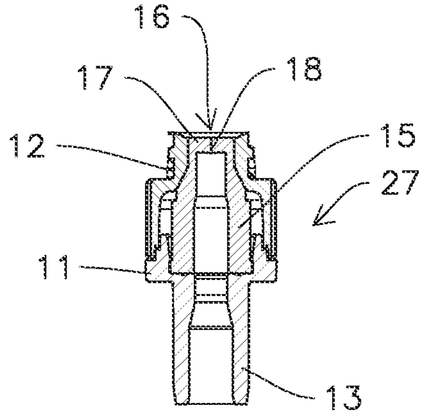
FIG. 4 shows an axial section of the second connector with hermetic closing valve which is included in the adapter.
Figure 5:
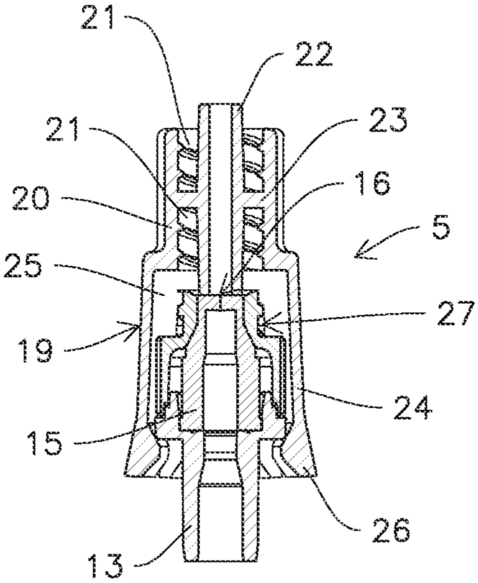
FIG. 5 shows an axial section of the adapter with the second connector in the closed valve condition.
Figure 6:
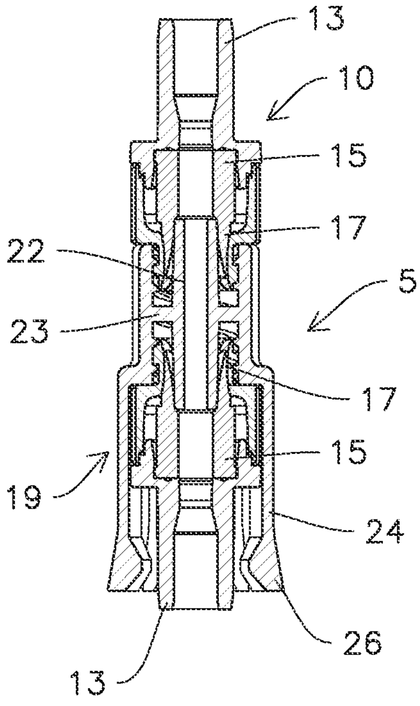
FIG. 6 shows how screwing the two connectors into the adapter causes the opening of the respective closing valves for the formation of a continuous axial passageway inside the adapter.

The adapter 5 has the structure and operating mode which can be seen in FIGS. 4-6. In particular, FIG. 5 shows that the adapter 5 comprises a hollow external body 19 which has a first end 20 with internal thread 21 and an axially bored, coaxial internal stem 22, without end tips, which protrudes axially from both ends of the internal thread 21 and is fixed to the hollow external body 19 by means of a median crosspiece 23 which divides the internal thread 21 into two axially overlapping parts. A second end 24 of the hollow external body 19 in turn includes an internal cavity 25 which accommodates, and retains by means of coupling ends 26, a second valve connector 27 such as that shown in FIG. 4, i.e., completely similar to the first valve connector 10 already described in FIG. 3.

The second valve connector 27, the description of which is not repeated and the constituent parts of which are indicated by the same reference numerals used for the first valve connector 10, can take the closed valve position shown in FIG. 5 in the cavity 25, or it can be forced from the outside towards the coaxial internal stem 22 and then screwed by means of the external thread 12 into the nearest part of the internal thread 21 to cause the coaxial internal stem 22 to penetrate into the hermetic closing valve 16 to open the communication between the axial bore of the coaxial internal stem 22 and the corresponding axial bore of the internal body 15 of the second valve connector 27 and of the corresponding tubular end 13, as shown in FIG. 6.

Similarly, the external threaded part 12 of the first valve connector 10 can be screwed into the outermost part of the internal thread 21 of the adapter 5 to cause the stem 22 to penetrate into the valve element 16 to open the communication between the axial bore of the same coaxial internal stem 22 and the corresponding axial bore of the internal body 15 of the first valve connector 10 and of the corresponding tubular end 13, as shown in FIG. 6.

Thereby, once the tubular end 13 of the first valve connector 10 has been inserted by pressing into the tube 14 of the bag 1 and the tubular end 13 of the second valve connector 27 has been inserted by pressing into the tube 6, as shown in FIG. 1, a single fluid path is opened between the tubes 14 and 6, which is instead closed when the first valve connector 10 is separated from the adapter 5 as in FIG. 2 and/or the second valve connector 27 is in the closed valve position as in FIG. 5.

Figure 7:
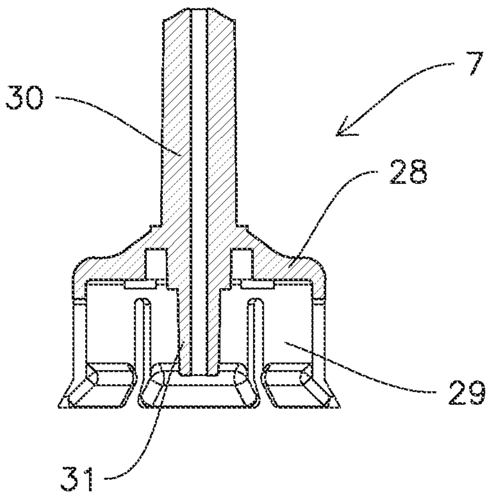
FIGS. 7 and 8 show axial sections of two possible embodiments of the device for coupling and piercing the vial.
Figure 8:
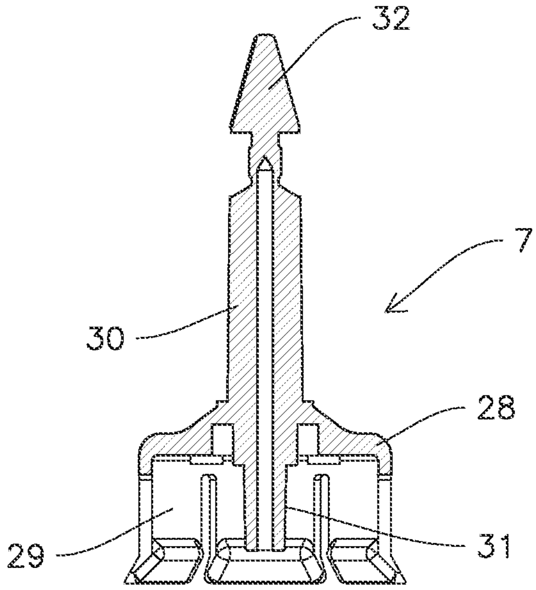

The coupling and piercing device 7 for coupling and piercing the cap of the vial 3 can be of any known type with a piercing needle or it can be of the type shown in two versions in FIGS. 7 and 8. In both versions in these figures, the coupling and piercing device 7 has a coupling part consisting of a bonnet 28 with circumferentially distributed toothed sectors 29 intended to be coupled to the cap of the vial 3 and a connecting part consisting of an axially bored stem 30 intended to be forcibly inserted by pressing into the end of the tube 6 opposite to that in which the tubular end 13 of the second valve connector 27 is press-forced. The aforesaid axial bored stem 30 has an end leg 31 shaped as a syringe luer extending into the bonnet 28, while the other end of the axial bored stem 30 can include, in the version in FIG. 8, a frangible element 32 to close the axial bore of the stem.

The bonnet 28 with toothed sectors 29 and the luer-shaped end leg 31 serve for coupling and piercing a vial cap, respectively, which is preferably, but not necessarily, of the type described in EP 2 867 132 B1. The vial 3 with related closing cap is shown in FIG. 9, where the cap is indicated by hermetically closing cap 33 and is applied to the thickened mouth 34 of the vial by means of a metal collar 35 with a central bore 36 and coupling flaps 37. According to EP 2 867 132 B 1, the hermetically closing cap 33 is made of an elastically deformable material and has a central part formed by a thin membrane 38 under which a thin slot 39 extends, which ends between a pair of lateral lips 40.

As shown in FIG. 10, by coupling the toothed sectors 29 of the bonnet 28 of the coupling and piercing device 7 below the mouth 34 of the vial 3, the luer-shaped leg 31 of the same device pierces the central membrane 38 of the closing cap and is inserted, widening it, into the slot 39 up to end in the internal space of the vial. A fluid path is thus formed which, if not blocked by a frangible element such as that indicated by 32 in FIG. 8, spans from the internal space of the vial 3 to the tube 6 and from there to the tubular end 13 of the second valve connector 27 of the adapter 5. That fluid path, with the two valve connectors 27 and 10 in the open position, ends into the flexible bag 1.

With reference to FIGS. 11-17, the method of using the assembly in FIGS. 1-10 is now explained.

With the bag 1 still separated from the rest of the assembly, the filling of the flexible bag 1 with a dosed amount of an appropriate liquid solution 2, such as a diluent or solvent (FIG. 1), is first carried out through the filling connector 8, preferably through a needleless luer syringe.

The toothed sectors 29 of the coupling and piercing device 7 are also coupled to the mouth of the vial 3 filled with active substance 4 with consequent piercing of the hermetically closing cap 33 by the leg 31, which penetrates into the vial 3 as shown in FIG. 10. The tube 6 is fitted onto the stem 30 of the coupling and piercing device 7 and onto the end 13 of the second valve connector 27 of the adapter 5, thus creating a fluid path which spans from the vial 3 to the second connector 27, still in the closed position in FIG. 5.

Figure 12:
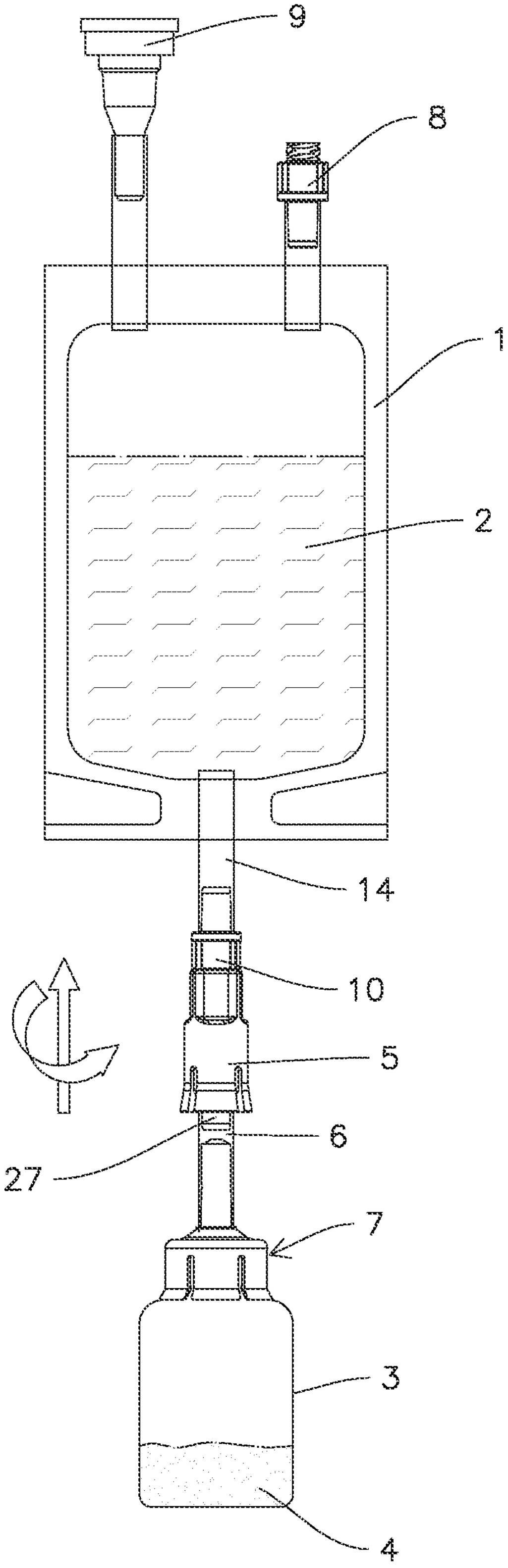

The first valve connector 10 is then inserted and screwed into the end 20 of the adapter 5 with consequent piercing of the membrane 17 and opening of the valve 16 of the first valve connector 10 (FIG. 12).

Figure 13:
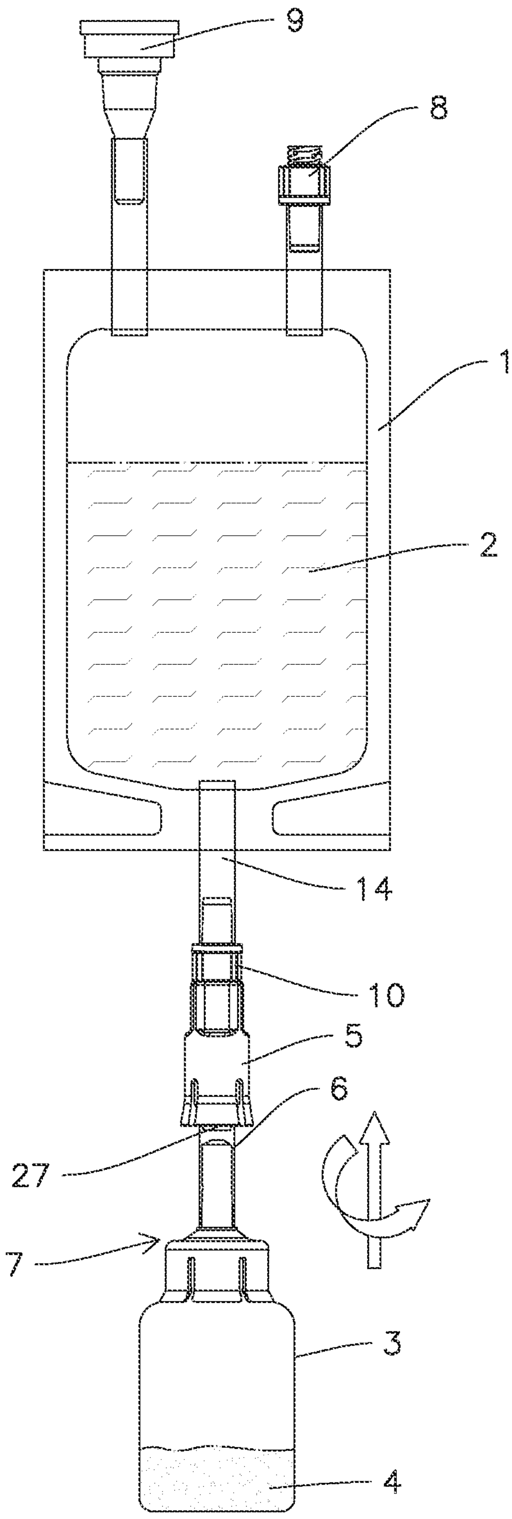

Immediately afterwards, the second valve connector 27 is forcibly inserted further into the adapter 5 and screwed into the neighboring part of the internal thread 21 with consequent piercing of the membrane 17 and opening of the hermetic closing valve 16 of the second valve connector 27 (FIG. 13).

A fluid path is thus completed, which spans from the vial 3 to the bag 1 and, in the presence of a frangible closing element 32 at the end of the coupling and piercing device 7 (FIG. 8), is opened by breaking the frangible element 32.

Figure 14:
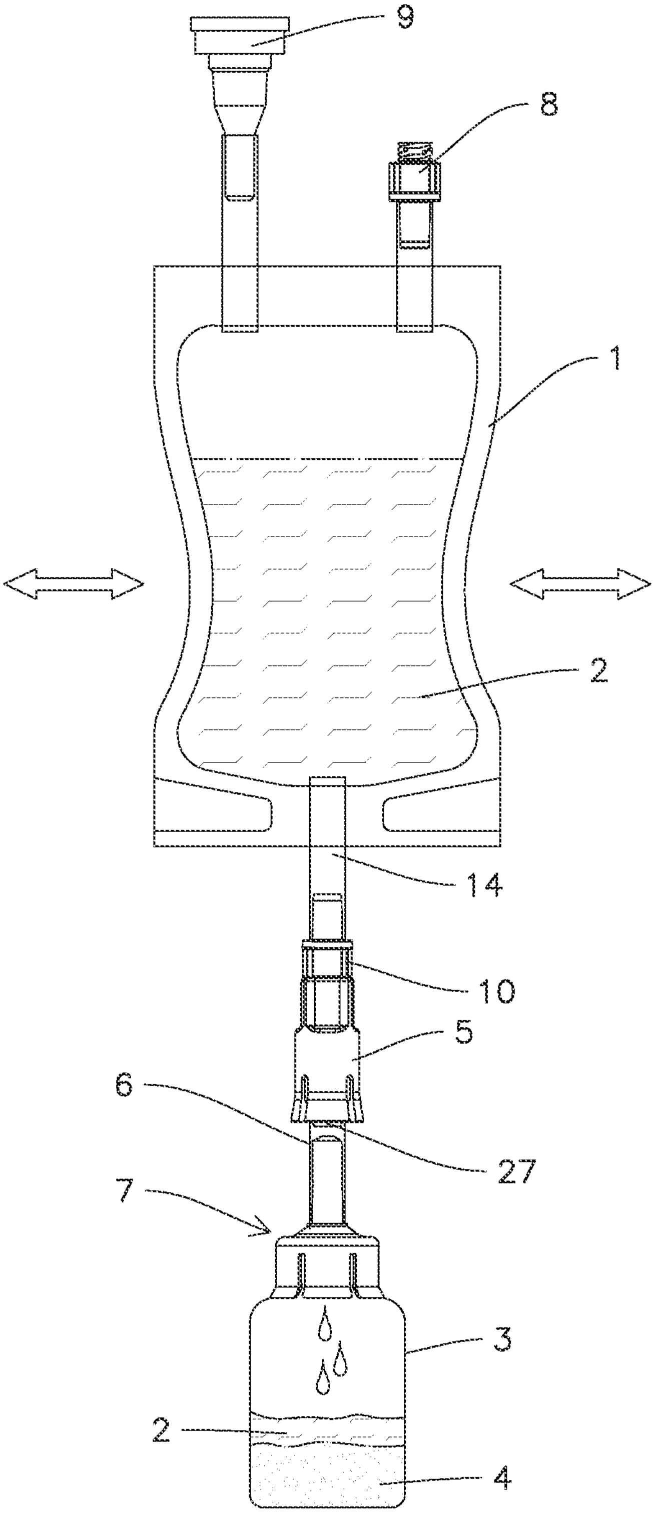

By laterally compressing the flexible bag 1, a part of the liquid solution 2 can thus be introduced into the vial 3, where it overlaps and then mixes with the active substance 4 (FIG. 14).

Figure 15:
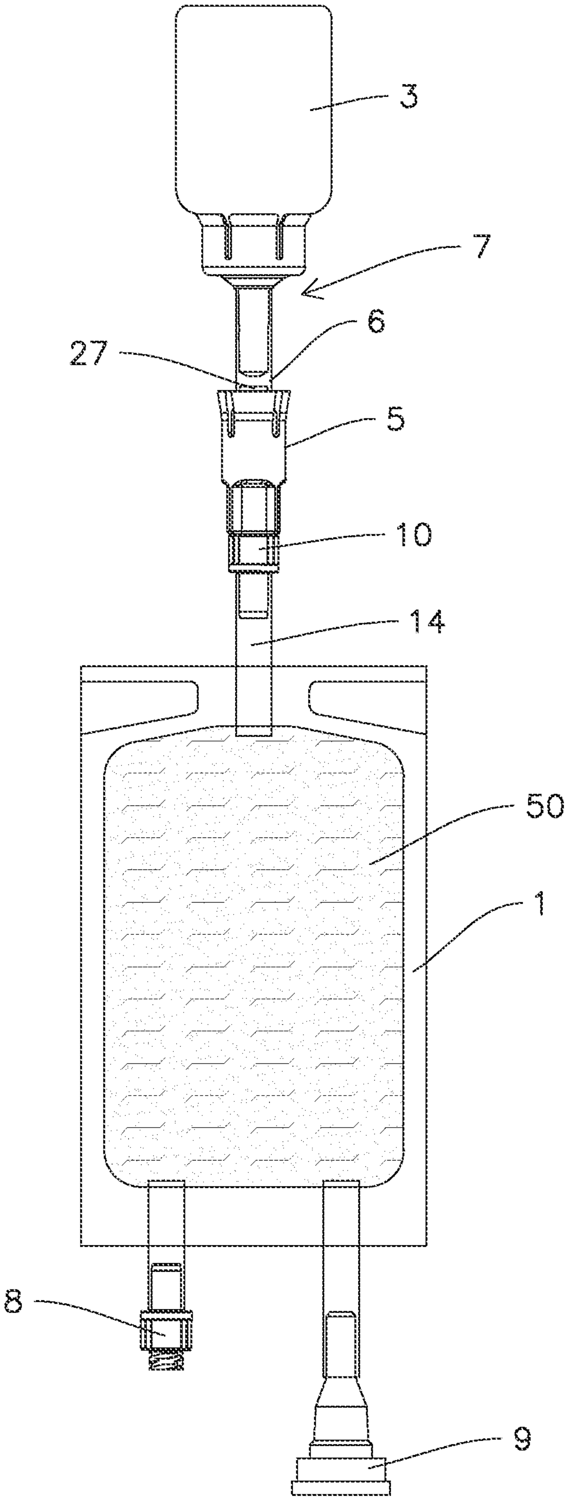
Figure 16:
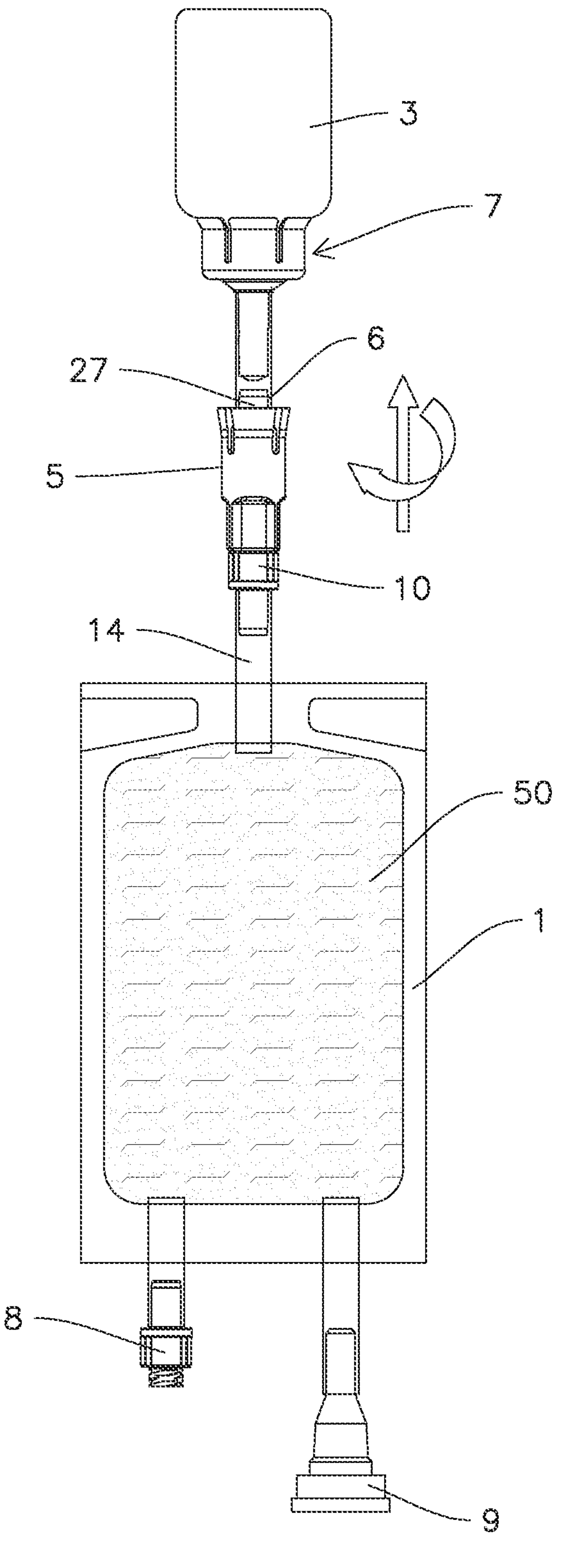

By turning over the assembly as shown in FIG. 15, the fluid mixture 50 thus formed between active substance 4 and liquid solution 2 is transferred into the bag 1.

Figure 17:
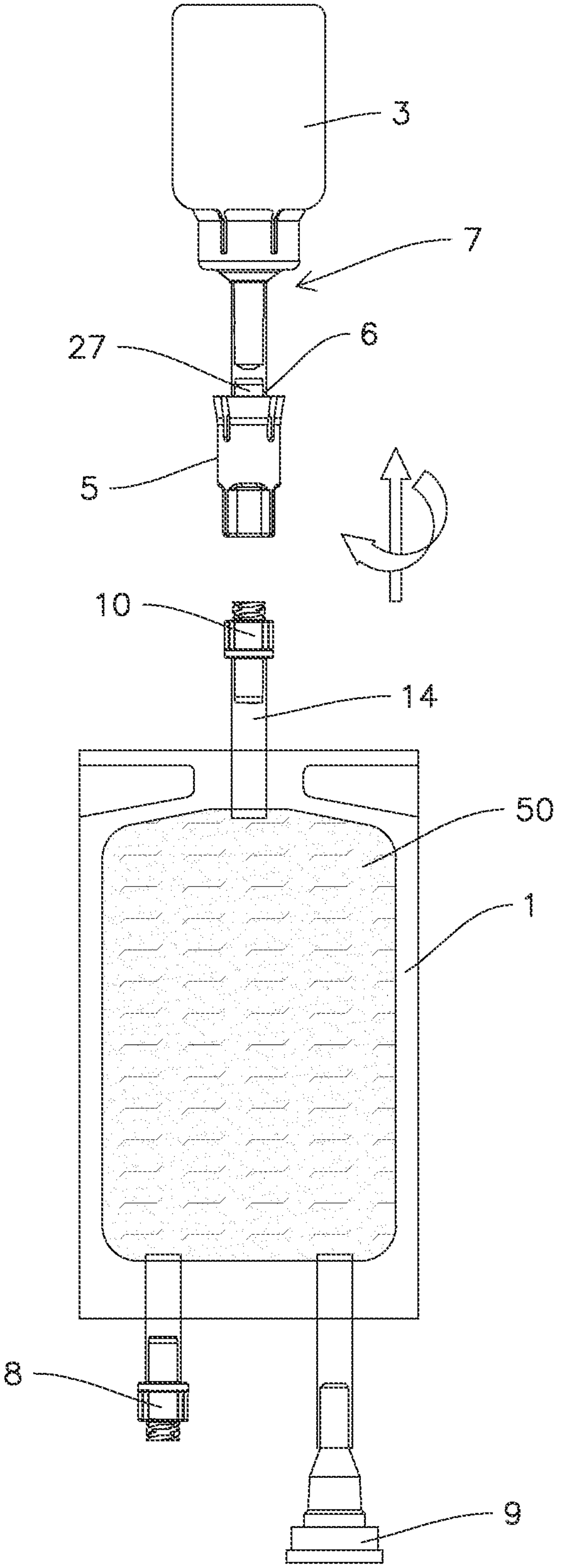

By operating in a reverse order compared to that described above, the second valve connector 27 of the adapter 5 is then unscrewed with consequent closing of the hermetic closing valve 16 of the second valve connector 27 (FIG. 16) and then the first valve connector 10 is unscrewed and extracted from the adapter 5 with consequent closing of the hermetic closing valve 16 of the connector 10 (FIG. 17).

Figure 11:
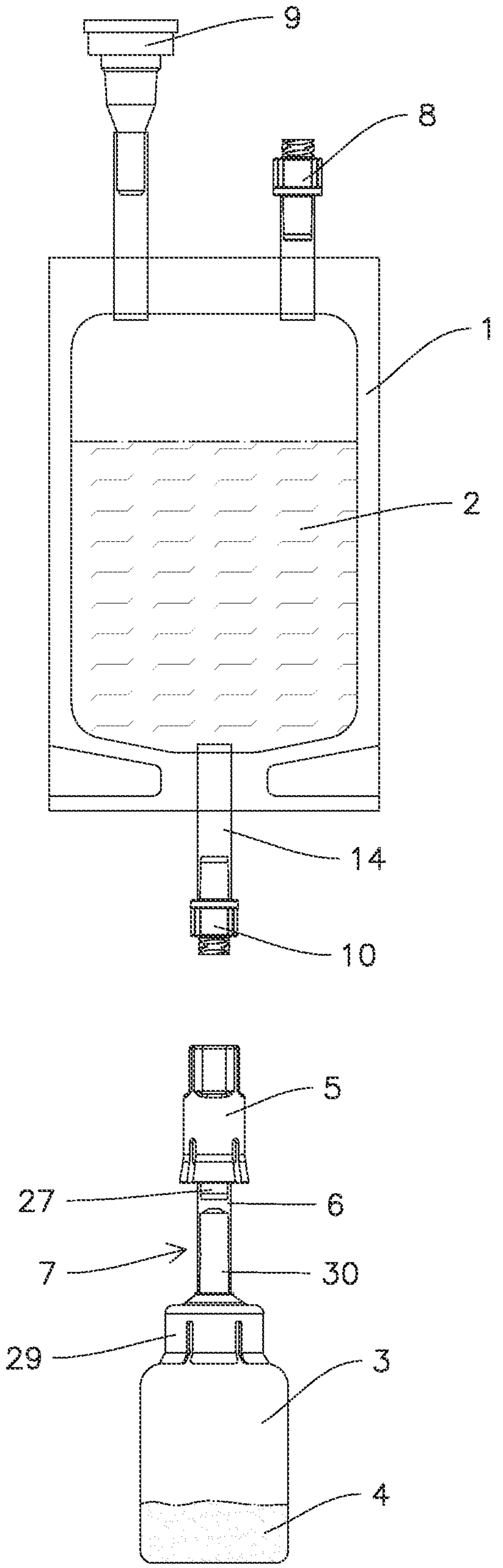
FIGS. 11-17 show an operating sequence which can be carried out with the assembly according to the invention for the formation of a fluid mixture of liquid solution and active substance inside the vial, the transfer of the fluid mixture from the vial to the bag, and the final separation of the bag from the rest of the assembly.

The bag 1 with mixture 50 is thus ready for use through the delivering connector 9 or it can be filled with other doses of the same active substance or with suitable doses of other active substances by connecting it to another vial 3, already prepared with the connection elements 5, 6 and 7 as shown in FIG. 11.

In both cases, the mixing of the liquid solution 2 with one or more active substances 4 inside one or more vials and the filling of the bag 1 with a fluid mixture which is deliverable to a patient occurs under completely and safely sterile conditions which avoid contamination of various type for both the product to be delivered and the external environment, in which the medical and nursing staff work.

The invention claimed is:

1. Assembly with connectable and disconnectable elements for the reconstitution of fluid drugs and nutrients with active substances in powder, liquid or gel form, comprising a flexible bag containing a liquid solution and provided with a first valve connector with a hermetic closing valve which is openable by axial pressure and automatically hermetically reclosable when the axial pressure is stopped, at least one vial containing an active substance in powder, liquid or gel form and provided with a hermetic closing cap which is openable by axial pressure, a coupling and piercing device which is couplable to the hermetic closing cap of the vial for piercing the hermetic closing cap, and an adapter with a hollow external body interposed between the first valve connector and the coupling and piercing device, wherein the hollow external body of the adapter has a first end provided with an internal thread which is fixable by screwing to the first valve connector and an axially bored coaxial internal stem lacking end points which, due to the screwing, causes the opening of the hermetic closing valve of the first connector by axial pressure and a second end which is fixable to the coupling and piercing device, the second end providing housing for a second valve connector for connection to the coupling and piercing device, the second valve connector including the hermetic closing valve which is openable by axial pressure and automatically hermetically reclosable when the pressure is stopped, the second valve connector being axially pressable within the second end of the hollow external body and screwable into the first end of the hollow external body so that the coaxial internal stem causes the opening of the hermetic closing valve of the second valve connector by axial pressure.

2. The assembly according to claim 1, wherein the flexible bag is provided with a filling connector with a hermetic closing valve which is openable by axial pressure and automatically hermetically reclosable when the pressure is stopped.

3. The assembly according to claim 1, wherein the flexible bag is further provided with an empty connector.

4. The assembly according to claim 1, wherein the coupling and piercing device comprises a coupling part consisting of a bonnet with circumferentially distributed toothed sectors and a connecting part consisting of an axially bored stem which is connectable to the second valve connector by means of a tube in which it is insertable by pressing, the axially bored stem having a luer-shaped end leg extending into the bonnet.

5. The assembly according to claim 4, wherein the axially bored stem includes a frangible element placed to close the axial bore thereof.

6. Method of using the assembly according to claim 1 for the reconstitution of fluid drugs and nutrients with active substances in powder, liquid or gel form, comprising the following sequence of steps:

a) coupling the coupling and piercing device to the vial containing the active substance in powder, liquid or gel form by piercing the hermetic closing cap by axial pressure;

b) connecting the coupling and piercing device to the second valve connector while the hermetic closing valve of the second valve connector is in a hermetically closed position;

c) screwing the first valve connector into the first end of the hollow external body of the adapter to open the hermetic closing valve of the first valve connector of the flexible bag previously filled with a dosed amount of the liquid solution;

d) applying an axial thrust to the second valve connector and screwing it into the first end of the hollow external body to open the hermetic closing valve of the second valve connector by the axially bored coaxial internal stem;

e) laterally compressing the flexible bag for the introduction of a part of the liquid solution into the vial through a fluid path formed by the first valve connector, the axially bored coaxial stem, the second valve connector, and the coupling and connecting device to obtain a desired fluid mixture of the active substance and the liquid solution;

f) placing upside down the assembly for the transfer of the desired fluid mixture from the vial to the flexible bag through the fluid path;

g) unscrewing the second valve connector from the first end of the hollow external body of the adapter to return the hermetic closing valve of the second valve connector to the hermetically closed position;

h) unscrewing the first valve connector from the first end of the hollow external body of the adapter to return the hermetic closing valve of the second connector to the hermetically closed position.

7. The method of use according to claim 6, comprising the repetition of the steps c), e), g), h) for filling the same flexible bag or different flexible bags with doses of the same or other active substances taken from vials previously prepared according to the steps a), b), d).

* * * * *